(12) United States Patent
Valensi et al.

(10) Patent No.: US 11,378,704 B2
(45) Date of Patent: Jul. 5, 2022

(54) METHOD FOR GENERATING AN IMAGE OF A SUBSURFACE OF AN AREA OF INTEREST FROM SEISMIC DATA

(71) Applicant: TOTAL SE, Courbevoie (FR)

(72) Inventors: Raphaël Valensi, Billere (FR); Reda Baina, Pau (FR)

(73) Assignee: TOTAL SE, Courbevoie (FR)

( * ) Notice: Subject to any disclaimer, the term of this patent is extended or adjusted under 35 U.S.C. 154(b) by 0 days.

(21) Appl. No.: 16/972,100

(22) PCT Filed: Jun. 8, 2018

(86) PCT No.: PCT/IB2018/000757
§ 371 (c)(1),
(2) Date: Dec. 4, 2020

(87) PCT Pub. No.: WO2019/234469
PCT Pub. Date: Dec. 12, 2019

(65) Prior Publication Data
US 2021/0223424 A1 Jul. 22, 2021

(51) Int. Cl.
*G01V 1/28* (2006.01)
*G01V 1/30* (2006.01)
(52) U.S. Cl.
CPC .............. *G01V 1/282* (2013.01); *G01V 1/303* (2013.01); *G01V 2210/512* (2013.01); *G01V 2210/614* (2013.01); *G01V 2210/675* (2013.01)
(58) Field of Classification Search
CPC .................................. G01V 1/282; G01V 1/303
See application file for complete search history.

(56) References Cited

U.S. PATENT DOCUMENTS

| 9,829,592 | B2 * | 11/2017 | Ramos-Martinez ... G01V 1/368 |
| 2018/0275302 | A1 * | 9/2018 | Calderon ............... G01V 1/282 |

OTHER PUBLICATIONS

Chapter 2 "Migration" pp. 5-75 (72 pages in cited document)—downloaded Jan. 22, 2021.

(Continued)

*Primary Examiner* — Bryan Bui
(74) *Attorney, Agent, or Firm* — Troutman Pepper Hamilton Sanders LLP

(57) ABSTRACT

The invention relates to a computer-implemented method for generating an image of a subsurface of an area of interest from seismic data. The method comprises providing seismic wavefields, providing a zero-offset seismic wavefield dataset, determining a seismic velocity parameter model w(x) comprising an initial model $w_0(x)$, a low frequency perturbation term $\delta m_b(x)$ and a high frequency perturbation term $\delta m_r(x)$, determining an optimal seismic velocity parameter model $w_{opt}(x)$ by computing a plurality of iterations, each iteration comprising calculating and optimizing a cost function, said cost function being dependent on the zero-offset seismic wavefield and on the low frequency perturbation term $\delta m_b(x)$ as a parameter in the optimization of the cost function, the high frequency perturbation term $\delta m_r(x)$ being related to the velocity parameter model w(x) to keep the provided zero-offset seismic wavefield data invariant with respect to the low frequency perturbation term $\delta m_b(x)$.

15 Claims, 7 Drawing Sheets

(56) References Cited

OTHER PUBLICATIONS

Jones, I. F., et al., "Prestack Depth Migration and Velocity Model Building" SEG Geophysics Reprint Series No. 25, 28 pages in cited document (2008)—downloaded Jan. 22, 2021.
Chapter 1 "Introduction" pp. 1-3 (4 pages in cited document)—downloaded Jan. 22, 2021.
Aster, R. C., et al. "Parameter Estimation and Inverse Problems" 9 pages in cited document (Jun. 2004) Article in La Recherche (Jan. 2012).
De Boor, C., "A Practical Guide to Splines" Springer, 7 pages in cited document.
Corliss, G., et al. "Automatic Differentiation of Algorithms" Springer (2002), 26 pages in cited document.
Nocedal, J., et al., "Numerical Optimization" Springer (2000), 683 pages in cited document.
Tarantola, A., "Inverse Problem Theory and Methods for Model Parameter Estimation" Society for Industrial and Applied Mathematics (2005) 358 pages in cited document.
Fichtner, A., et al. "The adjoint method in seismology I. Theory" Physics of the Earth and planetary Interiors 157:86-104 (2006).
Plessix, R.-E., "A review of the adjoint-state method for computing the gradient of a functional with geophysical applications" Geophys. J. Int. 167:495-503 (2006).
Thomsen, L., "Weak Elastic Anisotropy" Geophysics 51(10):1954-1966 (Oct. 1986).
Mallat, S., "A Wavelet Tour of Signal Processing The Sparse Way" Third Edition, Elsevier Inc. (2009), 824 pages in cited document.
International Search Report issued in corresponding International Patent Application No. PCT/IB2018/000757 dated Feb. 27, 2019.
Brossier, R., et al. "Velocity model building from seismic reflection data by full-waveform inversion" Geophysical Prospecting 63:354-367 (2015) cited in ISR submitted herewith—date cited in ISR as Nov. 11, 2014.
Xu., S., et al. "Full Waveform Inversion for Reflected Seismic Data" 74th EAGE Conference & Exhibition Incorporating SPE EUROPEC 2012 (Jun. 4-7, 2012), 5 pages cited in ISR submitted herewith—first author name cited in ISR as Lambare Gilles, NPL document reflects first author as S. Xu and date cited in ISR is Sep. 13, 2013, NPL document reflects Jun. 4-7, 2012.
Zhou, W., et al. "Velocity model building by waveform inversion of early arrivals and reflections A 2D case study with gas-cloud effects" Geophysics 53(2):1-17 (Mar.-Apr. 2018) cited in ISR submitted herewith—date cited in ISR as Jan. 29, 2018, NPL document reflects Mar.-Apr. 2018.

\* cited by examiner

METHOD FOR GENERATING AN IMAGE OF A SUBSURFACE OF AN AREA OF INTEREST FROM SEISMIC DATA

CROSS REFERENCE TO RELATED APPLICATION

This is a U.S. National Phase Application under 35 U.S.C. § 371 of International Patent Application No. PCT/162018/000757, filed Jun. 8, 2018. The entire contents of which are hereby incorporated by reference.

FIELD OF THE INVENTION

The present invention concerns a computer-implemented method for generating an image of a subsurface of an area of interest from seismic data.

BACKGROUND

In order to determine the structure of ground, the geological nature of the subsurface or the location of oil and gas reservoirs, seismic data may be used.

Indeed, when a seismic wave propagates through the ground from a seismic source to a seismic receiver, the recorded seismic wave contains information relative to the geophysical properties of the underground. Such properties may include seismic wave velocity, density and anisotropy properties.

In exploration geophysics, an image of the subsurface may be determined by recording seismic waves at the surface with a plurality of seismic sensors such as hydrophones or geophones, using various seismic processing methods.

For example, the time between transmission of the seismic wave and reception of the reflected seismic waves may be used to determine the distance to a geological interface. More advanced techniques, such as reflection velocity tomography, are able to use the kinematic information contained in the seismic data to determine a detailed seismic image of the underground.

Another method known as "full waveform inversion" or "full wavefield inversion" (FWI) uses full waveform information provided by the recorded seismic waves, i.e. both phase and amplitude data, both transmission seismic data and reflection seismic data, both primaries and multiples, contained in the recorded seismic dataset, to build a high resolution image of the underground geological formation.

Due to the high computational cost associated with the method, classical implementations utilize local optimization techniques to estimate optimal model parameters. A variety of local optimization methods are generally used. However, the classical FWI inverse problem is highly non-linear and the FWI method generally generates smooth velocity model updates mainly located in the shallow parts of the model. Therefore, as long as the starting model is not sufficiently close to the true model, the local optimization may not converge toward the right solution and may remain trapped in a wrong local solution.

Other approaches based on a model scale separation may also be used. However, these approaches have similar drawbacks and lead to a high computational cost and a slow convergence of the method.

SUMMARY

One aim of the invention is to provide a fast and efficient method for generating a very accurate image of a subsurface of an area of interest from seismic data.

To this aim, the subject-matter of the invention comprises the following steps:

providing seismic wavefields recorded with a plurality of seismic receivers over the area, providing a zero-offset seismic wavefield dataset, determining a seismic velocity parameter model $w(x)$, said seismic velocity parameter model associating for each location x of the area a seismic velocity parameter w, said seismic velocity parameter model comprising an initial model $w_0(x)$, a low frequency perturbation term $\delta m_b(x)$ and a high frequency perturbation term $\delta m_r(x)$, determining an optimal seismic velocity parameter model $w_{opt}(x)$ by computing a plurality of iterations, each iteration comprising calculating and optimizing a cost function, said cost function being a measure of discrepancies between the recorded seismic wavefields data and the modeled seismic wavefields data obtained using the seismic velocity parameter model $w(x)$, said cost function being dependent on the zero-offset seismic wavefield and on the low frequency perturbation term $\delta m_b(x)$ as a parameter in the optimization of the cost function, the high frequency perturbation term $\delta m_r(x)$ being related to the velocity parameter model $w(x)$ to keep the provided zero-offset seismic wavefield data invariant with respect to the low frequency perturbation term $\delta m_b(x)$.

The method according to the invention may comprise one or more of the following features, taken into consideration in isolation, or according to any one of any technically feasible combination:

a linearized perturbation of cost function with respect to $\delta m_b$ comprises at least a first linearized perturbation term, advantageously $F_b(u_0, \delta m_r)$ simulating the effect of the low frequency perturbation term on seismic data residuals and at least a second linearized perturbation term advantageously $F_r(u_0)F_{zo,r}^{-1}(u_0)F_{zo,b}(u_0, \delta m_r)$ compensating the effect of the seismic data perturbation to keep the provided zero-offset seismic wavefield data invariant, the seismic velocity parameter model $w(x)$ comprises a compression waves velocity model v or a squared slowness model $u(x)$, the squared seismic slowness u being related to the seismic velocity v by the relation $u=1/v^2$, the seismic velocity parameter model $w(x)$ comprises a seismic anisotropy term or an elasticity parameter term, the step for determining the optimal seismic velocity parameter model $w_{opt}(x)$ comprises expanding the low frequency perturbation term $\delta m_b(x)$ on basis functions, the basis functions being advantageously chosen among: uniform blocks, splines, polynomial or wavelet functions, the step for determining the optimal seismic velocity parameter model $w_{opt}(x)$ comprises determining associated expansion coefficients of the expansion of the low frequency perturbation term $\delta m_b(x)$ on the basis functions, the method comprises, at each iteration, updating the velocity parameter model and evaluating the high frequency perturbation term $\delta m_r(x)$ from the zero-offset seismic dataset and the updated seismic velocity parameter model using a migration operator, the migration operator being an approximate or an exact iterative or non-iterative migration operator, the migration operator is $F_{zo,r}^{-1}(\delta G_{zo}^{ob}, w_0 + \delta m_b(x))$, where $F_{zo,r}^{-1}$ is an inverse zero offset modeling operator associated with the high frequency perturbation term $\delta m_r(x)$, $\delta G_{zo}^{ob}$ is an observed zero offset time domain data, $w_0 + \delta m_b$ is a perturbed smooth model taking into account the low frequency perturbation term, the determining step comprises calculating at least the calculated wavefield and calculating pre-stack forward modeled reflection data on the basis of the migrated zero-offset domain seismic and evaluating the misfit between the calculated wavefield and the recorded data and advantageously a regularization term, the calculation of the pre-stack forward modeled reflection data comprises the evaluation of a zero-offset model using a migration operator, based on the velocity model w and the zero offset time domain observed data, the determination of the optimal seismic velocity parameter model $w_{opt}(x)$ comprises implementing a linear or non-linear local optimization method, the implementation step comprises providing at least the gradient of the cost-function with respect to the low frequency perturbation term or/and at least one sensitivity of computed data derivatives with respect to the low frequency perturbation term, the computed data including a calculated refracted/transmitted wavefield calculated from a seismic velocity model w obtained at a previous iteration and a computed pre-stack reflected wavefield obtained from a Born modeling based on the migrated zero-offset time domain data and the seismic velocity model obtained w from the previous iteration, the implementation step comprises:

summing a sensitivity contribution of a conventional Full Wave Inversion and a sensitivity contribution of a Reflected Full Wave Inversion and subtracting a supplementary term resulting from a chain of operators, the chain of operators including a first operator linearly acting on the low frequency perturbation $\delta m_b(x)$ synthetizing a zero-offset wavefield by modeling linear scattering effects generated by the perturbation $\delta m_b(x)$, a second migration operator transforming the synthetized zero-offset wavefield in a reflectivity image using the velocity model of the current iteration, and a third Born modeling operator generating from the reflectivity image a pre-stack modeled data at the same locations than a pre-stack observed data.

the method comprises providing seismic wavefields from several shots of seismic sources, and wherein providing at least the gradient of the cost-function with respect to the low frequency perturbation term comprises generating a gradient expression corresponding to a difference of a first gradient term minus a second gradient term, the first gradient term being representative of a sum of:

a full wave inversion gradient, computed based on the initial model, and a reflected waveform inversion gradient, the second gradient term, resulting from at least three operations:

for each shot, a pre-stack depth migration of seismic data residuals through the action of a first operator, advantageously $F_r^*(\hat{\omega},g,\hat{x},s,u_0)$, or a pre-stack depth migration of an adjoint source depending on the misfit function between the calculated wavefields and the recorded data through the action of a first operator, advantageously $F_r^*(\hat{\omega},g,\hat{x},s,u_0)$, demigration to zero-offset time domain through the action of a second operator, advantageously $(F_{zo,r}^{-1})^*(\hat{\omega},r,\hat{x},r,u_0)$, and conversion and inversion of the obtained zero-offset data to get a gradient update along zero-offset wave paths through the action of a third operator, advantageously $F_{zo,b}^*(\hat{\omega},r,\hat{x},r,u_0,F_{zo,r}^{-1}(\delta G_{zo}^{ob},u_0))$.

the method may comprise obtaining an image of the area of interest by extracting data from the optimal seismic velocity parameter model, advantageously by interpolation;

the recorded and modeled seismic wavefields comprise transmitted and reflected wavefields;

the method is implemented in a mathematical domain chosen among time, Fourier, Laplace or wavelets.

The invention also relates to a process for exploring and/or exploiting an area of interest comprising:

applying the method as defined above to obtain an image of a subsurface of the area of interest, drilling the area of interest based on said obtained image.

The invention also deals with a system for generating an image of a subsurface of an area of interest from seismic data, said system comprising:

a data recovery module for providing seismic wavefields recorded with a plurality of seismic receivers over the area, a zero-offset module for providing a zero-offset seismic wavefield dataset, a seismic velocity parameter model module for determining a seismic velocity parameter model $w(x)$, said seismic velocity parameter model associating for each location x of the area a seismic velocity parameter w, said seismic velocity parameter model comprising an initial model $w_0(x)$, a low frequency perturbation term $\delta m_b(x)$ and a high frequency perturbation term $\delta m_r(x)$, an optimal seismic velocity parameter model module for determining an optimal seismic velocity parameter model $w_{opt}(x)$ by computing a plurality of iterations, each iteration comprising calculating and optimizing a cost function, said cost function being a measure of discrepancies between the recorded seismic wavefields data and the modeled seismic wavefields data obtained using the seismic velocity parameter model $w(x)$, said cost function being dependent on the zero-offset seismic wavefield and on the low frequency perturbation term $\delta m_b(x)$ as a parameter in the optimization of the cost function, the high frequency perturbation term $\delta m_r(x)$ being related to the velocity parameter model $w(x)$ to keep the provided zero-offset seismic wavefield data invariant with respect to the low frequency perturbation term $\delta m_b(x)$.

The invention also deals with a computer program product comprising instructions which, when the program is executed by a computer, cause the computer to carry out the method described above.

BRIEF DESCRIPTION OF THE DRAWINGS

The invention will be better understood, upon reading of the following description, taken solely as an example, and made in reference to the following drawings, in which.

DETAILED DESCRIPTION OF THE DRAWINGS

In the following description, the quantities in bold, such as x refer to vectors quantities.

Figure 1:
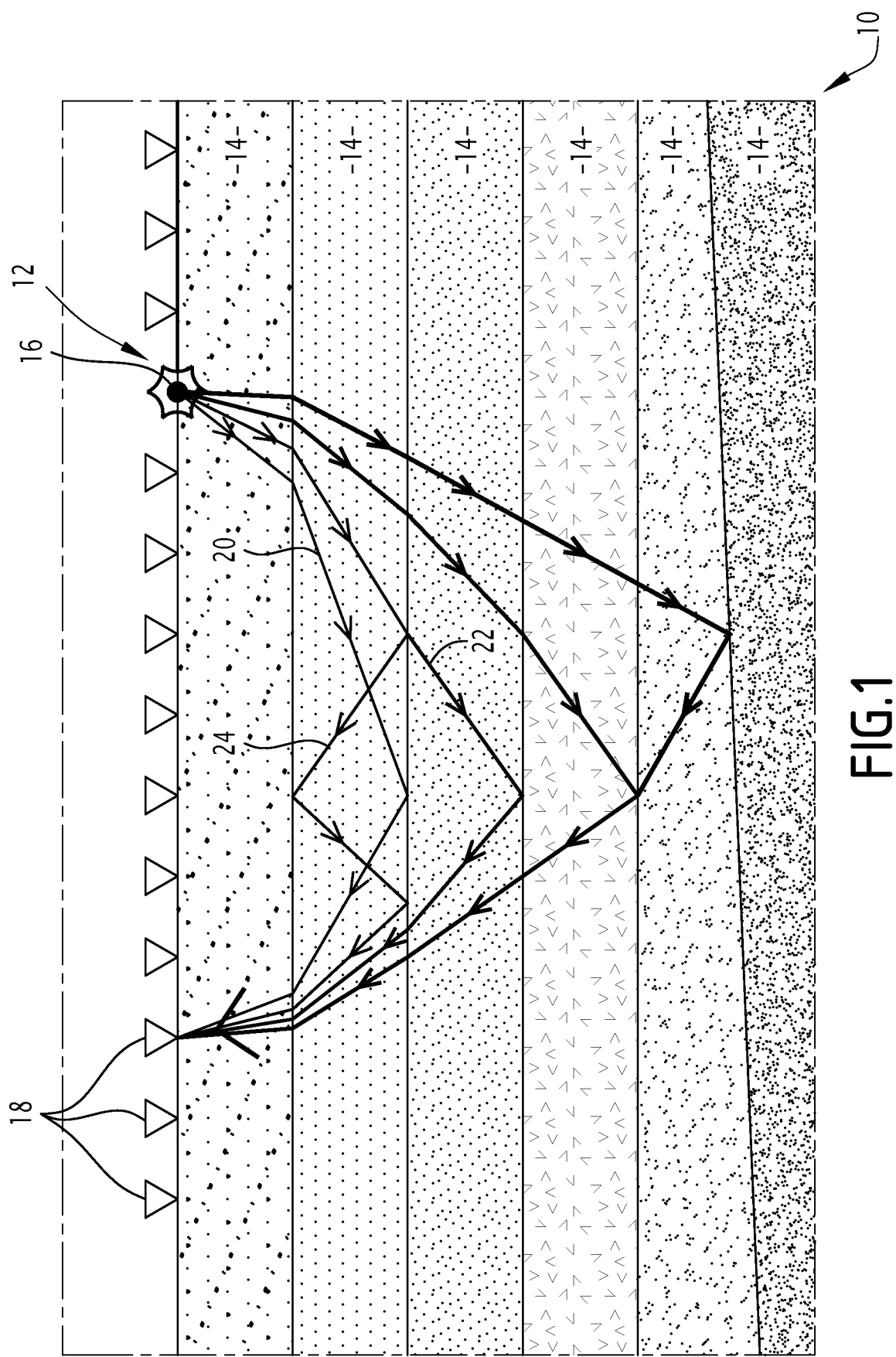
FIG. 1 is a schematic cross-section of a subsurface of an area where a seismic survey acquisition is carried out.

FIG. 1 show a schematic cross-section of a subsurface 10 of an area of interest 12, such as an oil and gas field, where a seismic survey acquisition is carried out using a seismic survey apparatus.

The seismic survey acquisition is typically a land seismic acquisition or a marine seismic acquisition.

The subsurface comprises a plurality of geological layers 14. Each geological layer 14 is characterized by seismic properties such as seismic velocities, density, anisotropy, etc.

The seismic acquisition comprises generating seismic waves into the ground with seismic sources 16 of the seismic survey apparatus, such as explosive, and recording seismic wavefields at the surface with a plurality of seismic sensors 18 of the seismic survey apparatus, such as hydrophones or geophones.

Typically, seismic wavefields from several shots of seismic sources are recorded.

FIG. 1 shows examples of wavefields recorded by the seismic sensors resulting from primary reflections 20 on the interfaces of the geological layers, from transmissions 22 through the geological layer or from multiple reflections 24 in a geological layer 14.

Figure 2:
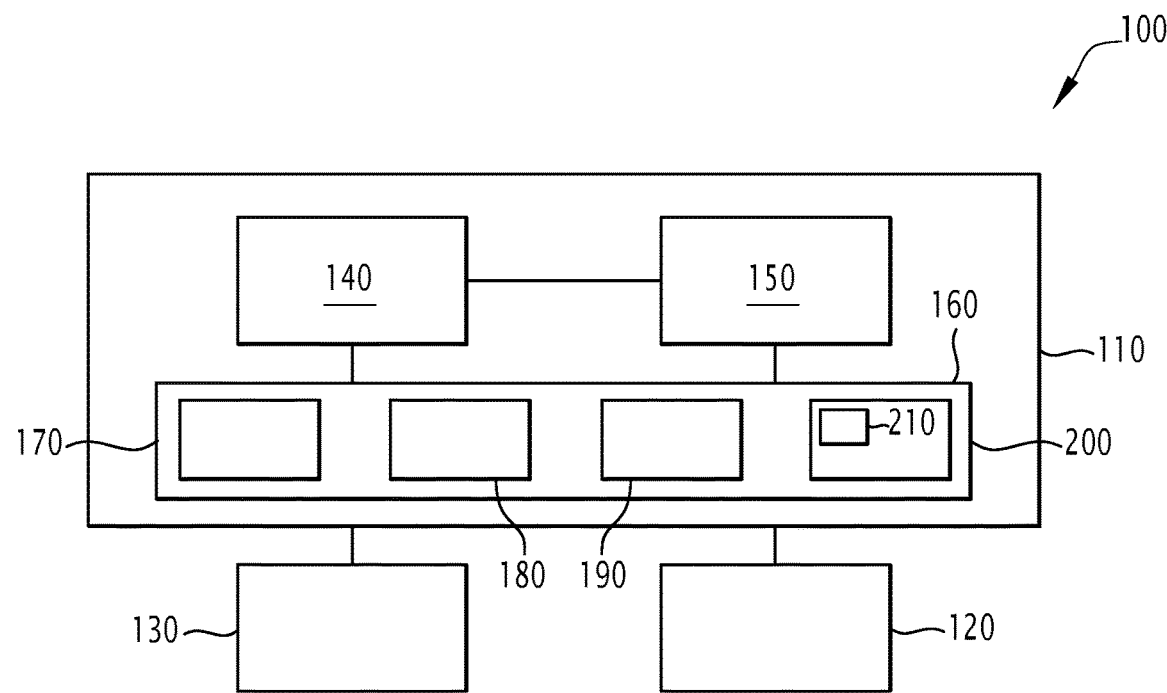
FIG. 2 is a schematic representation of system for generating an image of a subsurface of an area from seismic data, according to the invention.

FIG. 2 shows a system 100 for generating an image of a subsurface of an area from seismic data, according to the invention.

The system 100 comprises a calculator 110 for generating an image of a subsurface of an area from seismic data, a display unit 120 connected to the calculator 110 to display the results provided by the calculator and a man-machine interface 130.

The calculator 110 comprises a database 140. The database 140 contains seismic wavefields recorded with a plurality of seismic sensors in the area of interest.

The database 140 is moreover able to store the results provided by the calculator 110.

In the example of FIG. 2, the database 140 is a local database comprised in the calculator 110. In a variant (not represented), the database 140 is a remote database connected to the calculator 110 by a network.

The calculator 110 comprises a processor 150 and a memory 160 receiving software modules. The processor 150 is able to execute the software modules received in the memory 160 to carry out the method according to the invention.

The memory contains a data recovery 170 module for providing seismic wavefields recorded with a plurality of seismic sensors over the area. Typically, the seismic wavefields are provided by loading the data from the database 140.

The memory 160 comprises a zero-offset module 180 for providing a zero-offset seismic wavefield dataset.

The memory 160 also comprises a seismic velocity parameter model module 190 for determining a seismic velocity parameter model w(x), said seismic velocity parameter model associating for each location x of the area 12 a seismic velocity parameter w, said seismic velocity parameter model comprising an initial model $w_0(x)$, a low frequency perturbation term $\delta m_b(x)$ and a high frequency perturbation term $\delta m_r(x)$. The seismic velocity parameter model w(x) comprises a compression waves velocity model v or a squared slowness model u(x), the squared seismic slowness u being related to the seismic velocity v by the relation $u=1/v^2$.

In the following description, the seismic velocity parameter model w(x) used as a reference is a squared slowness model u(x).

In a variant, the seismic velocity parameter model w(x) comprises a seismic anisotropy term or an elasticity parameter term.

Anisotropy terms are defined as terms accounting for the velocity of the waves in the different directions of the space. They are defined as combinations of the elements of the stiffness tensors. For instance, widely used "Thomsen" "weak" anisotropy parameters ε, δ, γ are defined in "*Weak Elastic Anisotropy*", Thomsen, 1986, Geophysics, 51 (10): 1954-66.

The memory further comprises an optimal seismic velocity parameter model module 200 for determining an optimal seismic velocity parameter model $w_{opt}(x)$ by computing a plurality of iterations, each iteration comprising calculating and optimizing a cost function, said cost function being a measure of discrepancies between the recorded seismic wavefields data and the modeled seismic wavefields data obtained using the seismic velocity parameter model w(x), said cost function being dependent on the zero-offset seismic wavefield and on the low frequency perturbation term $\delta m_b(x)$ as a parameter in the optimization of the cost function, the high frequency perturbation term $\delta m_r(x)$ being related to the velocity parameter model w(x) to keep the provided zero-offset seismic wavefield data invariant with respect to the low frequency perturbation term $\delta m_b(x)$.

The cost function may include a classical regularization term for taking into account a priori information on the velocity parameter model. Examples of regularization terms and implementation may be found, for example, in "*Parameter Estimation and Inverse Problems*", Aster et al., 2011, Volume 90 International Geophysics, Academic Press, or in "*Inverse Problem Theory and Methods for Model Parameter Estimation*", Tarantola, 2005, SIAM.

In a variant, the optimal seismic velocity parameter model module 200 comprises an optimization submodule 210 for computing the gradient and/or the Fréchet derivatives and performing a linear or nonlinear local optimization method.

The display unit 120 is for example able to display the seismic images obtained with the method according to the invention. Moreover, the display unit 120 may display information relative to the progress of the method, such as the number of iterations, the lapsed time, etc.

Typically, the display unit 120 is a standard computer screen.

The man-machine interface 130 typically comprises a keyboard, a mouse and/or a touch screen to allow the user to activate the calculator 110 and the various software modules 170, 180, 190, 200 contained in the memory 160 to be processed by the processor 150.

Figure 3:
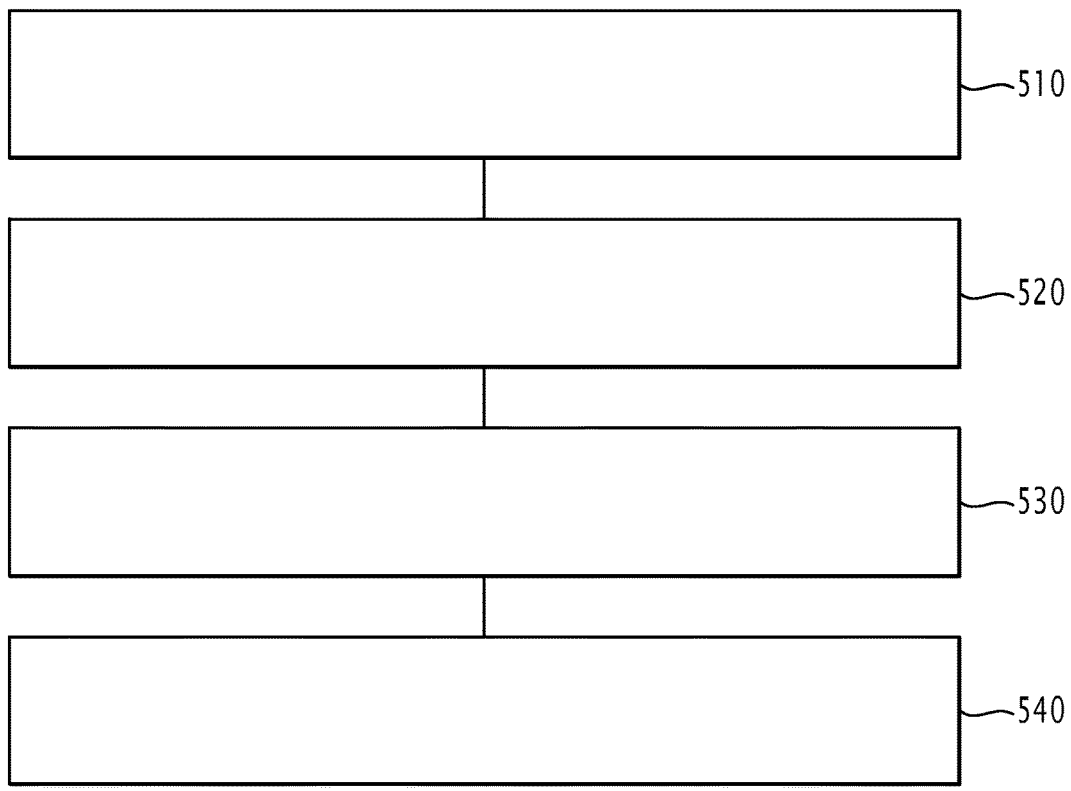
FIG. 3 is a flow chart of a method for generating an image of a subsurface of an area from seismic data, according to the invention.

A flow chart of a method for generating an image of a subsurface of an area from seismic data, according to the invention, carried out with a system 100 as described above is shown in FIG. 3.

Advantageously, the method may be implemented for generating an image of the subsurface of the area of interest 12 in two dimensions or in three dimensions.

The method comprises a step 500 for providing seismic wavefields recorded with a plurality of seismic sensors over the area, such as the area presented in FIG. 1.

The physical equation which governs the propagation of the seismic waves in the subsurface of the area is the wave equation.

The scalar wave equation can be written in the frequency domain as follows:

$$[\nabla^2 + \omega^2 u(x)]G(\omega, x, s) = -\delta(x-s) \qquad (1)$$

u(x) stands for the squared slowness at location x and it is related to heterogeneous wave propagation velocity model v(x) by the relation $u(x) = 1/v^2(x)$.

For the sake of clarity, in the following, u(x) is directly referred as the velocity model.

$G(\omega, x, s)$ is the Green function solution of the wave equation (1) for temporal frequency $\omega$, observed at position x, i.e. the position of the seismic receiver 18, and for a seismic source 16 at a spatial position s.

$\nabla^2$ and $\delta$ are respectively the Laplacian operator and the Dirac function.

A squared slowness model perturbation $\delta u(x)$ to a reference or background model $u_0(x)$ is considered following the equation:

$$u(x) = u_0(x) + \delta u(x) \qquad (2)$$

For the sake of clarity, in the following, $\delta u(x)$ is directly referred as the velocity model perturbation.

Similarly, an associated Green function perturbation associated to a position g of the seismic receiver 18, following the below mentioned relation is considered:

$$G(\omega, g, s) = G_0(\omega, g, s) + \delta G(\omega, g, s) \qquad (3)$$

$G_0(\omega, x, s)$ is the solution of the wave equation for the reference velocity model $u_0(x)$.

$\delta G(\omega, x, s)$ can be expressed as a solution of a non-linear integral equation, that takes the form:

$$\delta G(\omega, g, s, u_0, \delta u) = \int dx\, \omega^2 G_0(\omega, g, x, u_0) G(\omega, x, s, u_0 + \delta u) \delta u(x) \qquad (4)$$

Equation (4) is known as the Lipmann-Schwinger equation. It is the exact integral equivalent form for the partial differential wave equation (1).

Recursive expansion of equation (3) in the right-hand term of equation (4) leads to infinite scattering series. Truncating the series to the first two terms, it is obtained:

$$\delta G(\omega, g, s, u_0, \delta u) = \int dx\, \omega^2 G_0(\omega, g, x, u_0) G(\omega, x, s, u_0) \delta u(x) + \qquad (5)$$
$$\int dx \int d\hat{x}\, \omega^4 G_0(\omega, g, x, u_0) G_0(\omega, x, \hat{x}, u_0)$$
$$G_0(\omega, \hat{x}, s, u_0) \delta u(x) \delta u(\hat{x}) + O(\delta u^3)$$

where the vector variables x and $\hat{x}$ stand for location of the perturbations.

In a more compact form, it can be written:

$$\delta G(\omega, g, s, u_0, \delta u) = \int dx B_1(\omega, g, x, s, u_0) \delta u(x) + \qquad (6)$$
$$\int dx \int d\hat{x} B_2(\omega, g, x, \hat{x}, s, u_0) \delta u(x) \delta u(\hat{x}) + O(\delta u^3)$$

This form makes clearer the contribution of the first and second order model perturbations and the associated first and second order Fréchet derivatives $B_1$ and $B_2$.

$B_1$ and $B_2$ have the following forms:

$$B_1(\omega, g, x, s, u_0) = \frac{\partial G(\omega, g, s, u_0, \delta u)}{\partial u(x)} \qquad (7)$$
$$= \omega^2 G_0(\omega, g, x, u_0) G(\omega, x, s, u_0),$$

$$B_2(\omega, g, x, \hat{x}, s, u_0) = \frac{\partial^2 G(\omega, g, s, u_0, \delta u)}{\partial u(x) \delta u(\hat{x})} \qquad (8)$$
$$= \omega^4 G_0(\omega, g, x, u_0) G_0(\omega, x, \hat{x}, u_0) G_0(\omega, \hat{x}, s, u_0)$$

$B_1$ is classically known as the kernel of the $1^{st}$ Born approximation.

The method comprises modeling a scale separated model perturbation.

To this aim, the velocity model perturbation $\delta u(x)$ is considered as a sum of a smooth or low frequency perturbation $\delta m_b$ and a short scale or high frequency perturbation $\delta m_r$.

The subscripts b and r respectively refer to the background model perturbation and to the reflectivity model perturbation.

The above-mentioned decomposition can be written as the following:

$$u(x) = u_0(x) + \delta u(x) \qquad (9)$$
$$= u_0(x) + \delta m_r(x) + \delta m_b(x) \qquad (10)$$

Equation (10) is introduced into the second order Born series equation (6):

$$\delta G(\omega, g, s, \delta m_r, \delta m_b) = \qquad (11)$$
$$\int dx B_1(\omega, g, x, s, u_0) \delta m_r(x) + \int dx B_1(\omega, g, x, s, u_0) \delta m_b(x) +$$
$$\int dx \int d\hat{x} B_2(\omega, g, x, \hat{x}, s, u_0) \delta m_r(x) \delta m_b(\hat{x}) +$$
$$\int dx \int d\hat{x} B_2(\omega, g, x, \hat{x}, s, u_0) \delta m_b(x) \delta m_r(\hat{x}) +$$
$$\int dx \int d\hat{x} B_2(\omega, g, x, \hat{x}, s, u_0) \delta m_r(x) \delta m_r(\hat{x}) +$$
$$\int dx \int d\hat{x} B_2(\omega, g, x, \hat{x}, s, u_0) \delta m_b(x) \delta m_b(\hat{x}) + O(\delta u^3)$$

The first order effect of both high frequency perturbation $\delta m_r$, and low frequency perturbation $\delta m_b$ are only considered.

Then the last two terms of equation (11) are neglected, and equation (11) can be written as:

$$\delta G(\omega, g, s, u_0, \delta m_r, \delta m_b) = \quad (12)$$

$$\int dx B_1(\omega, g, x, s, u_0) \delta m_r(x) + \int dx B_1(\omega, g, x, s, u_0) \delta m_b(x) +$$

$$\int dx \int d\hat{x} \{B_2(\omega, g, \hat{x}, x, s, u_0) + B_2(\omega, g, x, \hat{x}, s, u_0)\}$$

$$\delta m_r(\hat{x}) \delta m_b(x) + O(\delta^2 m_r, \delta^{2m_b})$$

The Frechet derivatives $F_r$ and $F_b$ associated respectively to $\delta m_r$ and $\delta m_b$ can be expressed as the following:

$$F_r(\omega, g, x, s, u_0) = \frac{\partial G(\omega, g, s, u_0, \delta m_r, \delta m_b)}{\partial \delta m_r(x)} \quad (13)$$
$$= B_1(\omega, g, x, s, u_0)$$
$$= \omega^2 G_0(\omega, g, x, u_0) G(\omega, x, s, u_0)$$

and $$F_b(\omega, g, x, s, \delta m_r) = \quad (14)$$
$$\frac{\partial G(\omega, g, s, u_0, \delta m_r, \delta m_b)}{\partial \delta m_b(x)} = B_1(\omega, g, x, s, u_0) +$$
$$\int d\hat{x} \{B_2(\omega, g, \hat{x}, x, s, u_0) + B_2(\omega, g, x, \hat{x}, s, u_0)\} \delta m_r(\hat{x}) =$$
$$\omega^2 G_0(\omega, g, x, u_0) G(\omega, x, s, u_0) +$$
$$\omega^4 \int d\hat{x} G_0(\omega, g, \hat{x}, u_0) G_0(\omega, \hat{x}, x, u_0) G_0(\omega, x, s, u_0) \delta m_r(\hat{x}) +$$
$$\omega^4 \int d\hat{x} G_0(\omega, g, x, u_0) G_0(\omega, x, \hat{x}, u_0) G_0(\omega, \hat{x}, s, u_0) \delta m_r(\hat{x})$$

By introducing equations (13) and (14) in equation (12), the action of model perturbation on the wavefield can be written in the following compact form as:

$$\delta G(\omega, g, s, u_0 \delta m_r, \delta m_b) = \quad (15)$$
$$\int dx F_r(\omega, g, x, s, u_0) \delta m_r(x) + \int dx F_b(\omega, g, x, s, u_0, \delta m_r) \delta m_b(x)$$

The first term on the right hand side of equation (15) simulates the effect of the depth reflectivity or high frequency model perturbation keeping the smooth velocity model $u_0$ fixed. In other words, it generates the reflected wavefield components. It corresponds to the classical first order Born modeling.

The second term on the right hand side of equation (15) simulates the effect on the wavefield of a smooth velocity model perturbation keeping the depth reflectivity model fixed. It has a main effect of kinematic perturbation to both reflected wavefield components and to transmitted wavefield components.

Previous equation (15) shows the high frequency model perturbation $\delta m_r$ as an argument of the Frechet derivative $F_b$ relative to the smooth perturbation $\delta m_b$. This emphasizes clearly the explicit dependency of $\delta m_r$ in equation (14).

If the depth reflectivity is set to zero, the second term of the right-hand side of equation (15) simplifies to the action of the kernel $B_1$ and should generate perturbation only to direct arrival and diving wavefield (i.e. background wavefield).

Compared to the linearized modeling given in the equation (6), equation (15) which represents the linearized modeling after scale separation splits explicitly the action of high frequency and smooth model components. It also designates the terms responsible respectively for reflected events generation (mainly amplitude effect), transmitted events kinematic perturbation and finally reflected events kinematic perturbation.

The usual full wave inversion (FWI) method formulates the problem of retrieving the velocity model using the standard least-squares cost function $C^{FWI}$:

$$C^{FWI}(u) = \frac{1}{2} \int ds \int dg \int d\omega |G^{ob}(\omega, g, s) - G^{cal}(\omega, g, s, u)|^2 \quad (16)$$

$G^{ob}$ and $G^{cal}$ are respectively the observed and simulated wavefields.

It is assumed that the optimal model u occurs at the minimum value of the cost function $C^{FWI}$ which corresponds to the misfit or the discrepancies between the recorded seismic wavefields data and the modeled seismic wavefields data obtained using the seismic velocity parameter model w(x)

Standard FWI solves this problem by iterative linearization around a background or reference model $u_0$. Then, by introducing equation (2), it is obtained:

$$C^{FWI}(u_0 + \delta u) = \quad (17)$$
$$\frac{1}{2} \int ds \int dg \int d\omega |\delta G^{ob}(\omega, g, s, u_0) - \delta G^{cal}(\omega, g, s, u_0, \delta u)|^2$$

wherein the notations of the observed and simulated wavefield residuals are introduced:

$$\delta G^{ob}(\omega,g,s,u_0) = G^{ob}(\omega,g,s) - G^{cal}(\omega,g,s,u_0) \quad (18)$$

$$\delta G^{cal}(\omega,g,s,u_0,\delta u) = G^{cal}(\omega,g,s,u_0+\delta u) - G^{cal}(\omega,g,s,u_0) \quad (19)$$

Assuming the linearization in equation (6) for a given linearized iteration around the velocity model $u_0$ restricted to the first order (i.e. conventional Born approximation), the cost function in equation (17), can be approximated by $$C^{FWI}(\delta u + u_0) = \frac{1}{2} \int ds \quad (20)$$
$$\int dg \int d\omega \left| \delta G^{ob}(\omega, g, s, u_0) - \int dx F_{\delta u}(\omega, g, x, s, u_0) \delta u(x) \right|^2$$

The notation of the kernel $F_{\delta u} = B_1$ is introduced to emphasize the meaning of Frechet derivative versus the unknown full model perturbation $\delta u$ without any scale separation.

The method according to the invention comprises introducing the scale separation of model perturbation (equation 2) in the linearized equation (15) of the wavefield perturbation $\delta G^{cal}$ in the FWI cost function $C^{FWI}$.

This leads to the standard Reflection Full Waveform Inversion (RFWI) cost function denoted $C^{RFWI}$ that takes the form:

$$C^{RFWI}(\delta m_r, \delta m_b) = \frac{1}{2} \int ds \quad (21)$$

$$\int dg \int d\omega \Big| \delta G^{ob}(\omega, g, s, u_0) - \int dx F_r(\omega, g, x, s, u_0) \delta m_r(x) -$$

$$\int dx F_b(\omega, g, x, s, u_0, \delta m_r) \delta m_b(x) \Big|^2$$

Equation (21) shows that assuming an estimated background velocity $u_0$, the RFWI approach needs to estimate the two-coupled unknown parameters $\delta m_r$ and $\delta m_b$.

The method then comprises a step 510 for providing a zero-offset seismic wavefield dataset.

Figure 4:
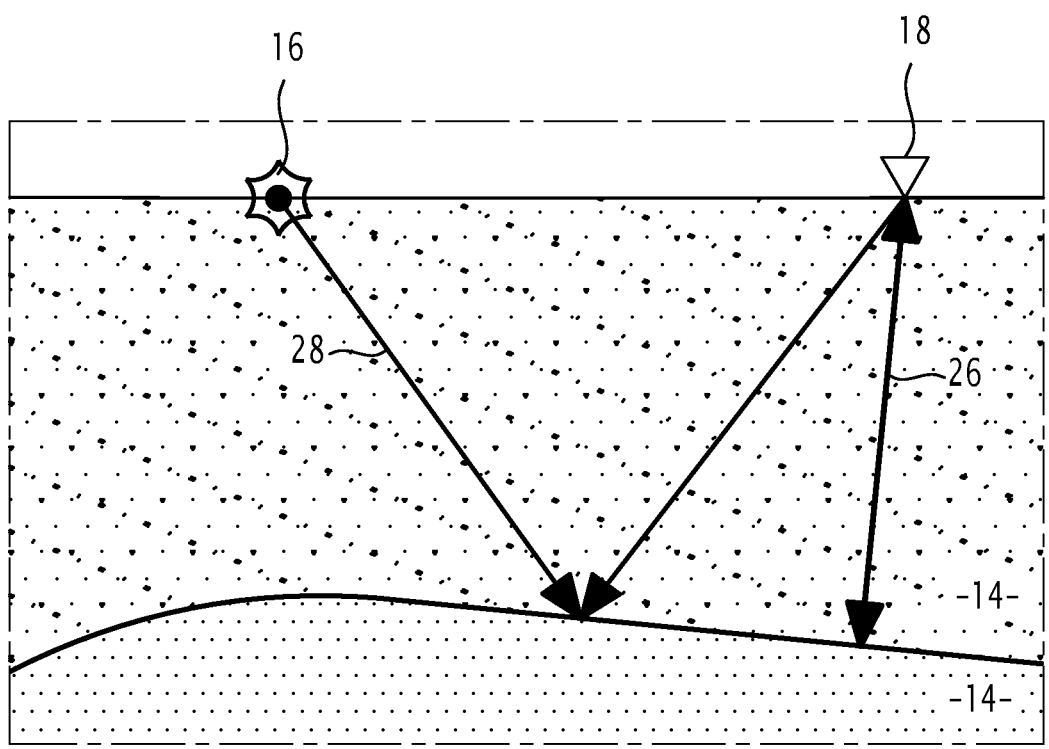
FIG. 4 is a schematic representation of a zero-offset seismic data.

FIG. 4 shows an example of zero-offset data 26 which correspond to data acquired with no horizontal distance between the source 16 and the receiver 18, compared to data 28 acquired with a horizontal distance between the source 16 and the receiver 18.

In a variant, the zero-offset seismic wavefield dataset is obtained by time domain processing of the seismic wavefields data or by operating a zero-offset de-migration of an optimized seismic reflectivity image.

Applying a move-out correction and the stacking seismic data acquired with separated sources 16 and receivers 18 gives the data the appearance of zero-offset data.

Typically, zero-offset seismic data are available from direct measurements or from a reliable reconstructed version from seismic processing known from the skilled person, for example, normal moveout (NMO) stack, zero-offset common reflection surface (ZO-CRS), demigration of the pre-stack time migration (PSTM), pre-stack depth migration (PSDM), etc.

In the following, the zero-offset time domain data is identified to the observed wavefield $\delta G^{ob}(\omega, g=s,s)$.

In the following, the observed and computed zero-offset time domain data at the coincident receiver-source position r are denoted by $\delta G_{zo}^{ob}(\omega,r)$ and $\delta G_{zo}^{cal}(\omega,r,u_0,\delta m_r,\delta m_b)$, respectively.

Equation (15) is now written for $\delta G_{zo}^{cal}/(\omega,r)$, the linearized calculated zero-offset time domain data:

$$\delta G_{zo}^{cal}(\omega, r, u_0 \delta m_r, \delta m_b) = \int dx F_{zo,r}(\omega, r, x, r, u_0) \delta m_r(x) + \quad (22)$$

$$\int dx F_{zo,b}(\omega, r, x, r, u_0, \delta m_r) \delta m_b(x)$$

The subscript zo for "zero-offset" is used here to avoid confusion with finite offset Fréchet derivative kernel.

The method further comprises providing the inverse of zero-offset reflectivity modeling operator $\delta m_r(x) = F_{zo,r}^{-1}(\delta G_{zo}^{ob}, u_0)$ generating a reflectivity model resulting from zero-offset data $\delta G_{zo}^{ob}(\omega,r)$ in a velocity model $u_0(x)$. The differential kernel associated to the operator $\delta F_{zo,r}^{-1}$ is denoted $F_{zo,r}^{-1}$.

The operator $F_{zo,r}^{-1}$ may be approximated and provided by a true amplitude or least squares zero-offset migration implementation or the combination of both.

The high frequency perturbation $\delta m_r$ can be inverted by matching the simulated $\delta G_{zo}^{cal}$ to $\delta G_{zo}^{ob}$, considering a given velocity model.

It follows from this matching that the zero-offset data are independent of the background model $u_0+\delta m_b$, i.e. the computed and observed data zero-offset data are an invariant with respect to the velocity perturbation $\delta m_b$.

Then the reflectivity image $F_{zo,r}^{-1}(\delta G_{zo}^{ob}, u_0+\delta m_b)$ consistent at the first order with the model $u_0+\delta m_b$ and the zero-offset data $\delta G_{zo}^{ob}$ is:

$$F_{zo,r}^{-1}(\delta G_{zo,r}^{ob}, u_0+\delta m_b) = \int dr \int d\omega F_{zo,r}^{-1}(\omega,r,x,r,u_0) \quad (23)$$

$$(\delta G_{zo}^{ob}(\omega,r) - \int dy F_{zo,b}(\omega,r,y,r,u_0,F_{zo,r}^{-1}(\delta G_{zo}^{ob},u_0)) \delta m_b(y))$$

where y indicates the location of the low frequency perturbation $\delta m_b(y)$ Equation (23) is an explicit linearized expression which allows an estimation of the high frequency model perturbation or reflectivity model $F_{zo,r}^{-1}(\delta G_{zo}^{ob}(\omega,r), u_0+\delta m_b)$ associated to the perturbed smooth model $u_0+\delta m_b$. This estimation is based on two input data.

The first input is an initial reflectivity depth image that is kinematically consistent with the unperturbed $u_0$ (i.e. produced by zero-offset migration using $u_0$ as velocity model).

The second input data is the zero-offset time domain data $\delta G_{zo}^{ob}$.

The above-mentioned procedure can be viewed as a linearized zero-offset residual migration operator that takes into account the smooth model perturbation $\delta m_b$ effect and maps the initial zero-offset depth image $\delta m_r(u_0) = F_{zo,r}^{-1}(\delta G_{zo}^{ob}, u_0)$ to another zero-offset depth image $\delta m_r(u_0+\delta m_b) = F_{zo,r}^{-1}(\delta G_{zo}^{ob}, u_0+\delta m_b)$.

The method then comprises expanding the low frequency perturbation term $\delta_{m_b}$ on a family of basis functions $\beta_i$.

For example, basis functions are splines (A Practical Guide to Splines, Carl de Boor, Springer New York, 2001), uniform blocks or wavelet functions (A Wavelet Tour of Signal Processing: The Sparse Way, Stephane Mallat, third edition, Academic Press, 2008).

It can be written:

$$\delta m_b(x) = \sum_i \beta_i(x) \delta \lambda_i \quad (24)$$

The set $\delta \Lambda = \{\delta \lambda_i\}$ are the model expansion coefficients in the orthogonal basis function and then the coefficients $\delta \lambda_i$ become the unknown of the model building inverse problem.

Using equations (23) and (24), the action of Frechet derivative $F_r(\omega,g,x,s,u_0)$ on the high frequency model perturbation $F_{zo,r}^{-1}(\delta G_{zo}^{ob}, u_0+\delta m_b)$ is expressed by:

$$\int dx F_r(\omega, g, x, s, u_0) F_{zo,r}^{-1}(\delta G_{zo}^{ob}, u_0+\delta m_b) = \quad (25)$$

$$\int dx F_r(\omega, g, x, s, u_0) \int dr \int d\hat{\omega} F_{zo,r}^{-1}(\hat{\omega}, r, x, r, u_0) \delta G_{zo}^{ob}(\hat{\omega}, r) -$$

$$\sum_i \delta \lambda_i \int dx F_r(\omega, g, x, s, u_0) \int dr \int d\hat{\omega} F_{zo,r}^{-1}(\hat{\omega}, r, x, r, u_0).$$

$$\int dy F_{zo,b}(\hat{\omega}, r, y, r, u_0, F_{zo,r}^{-1}(\delta G_{zo}^{ob}, u_0)) \beta_i(y)$$

where $\hat{\omega}$ indicates the frequency pulsation.

A linear modeling operator $F_{TWIN}$ is introduced.

$$F_{TWIN}(\omega, g, s, u_0)_i = \quad (26)$$

$$\int dx F_b(\omega, g, x, s, u_0, \delta m_r) \beta_i(x) - \int dx F_r(\omega, g, x, s, u_0) \int dr$$

$$\int d\hat{\omega} F_{zo,r}^{-1}(\hat{\omega}, r, x, r, u_0) \int dy F_{zo,b}(\hat{\omega}, r, y, r, u_0, \delta m_r) \beta_i(y)$$

This linear modeling operator simulates (up to first order) the effect of the low frequency background model perturbation on seismic data residuals $\delta R^{ob}$ which will be defined below.

The first term $F_b(u_0, \delta m_r) = \int dx\, F_b(\omega, g, x, s, u_0, \delta m_r)\beta_i(x)$ of the linear modelling operator $F_{TWIN}(\omega, g, s, u_0)_i$ models data perturbation for both transmitted waves components and reflected wavefields. The second term $$F_r(u_0)F_{z_o,r}^{-1}(u_0)F_{z_o,b}(u_0, \delta m_r) = \int dx F_r(\omega, g, x, s, u_0)$$
$$\int dr \int d\hat{\omega} F_{z_o,r}^{-1}(\hat{\omega}, r; x, r, u_0) \int dy F_{z_o,b}(\hat{\omega}, r; y, r, u_0, \delta m_r)\beta_i(y)$$

of the linear modelling operator $F_{TWIN}(\omega, g, s, u_0)_i$ compensates the partial effect of data perturbation to keep the zero offset data subset invariant.

$F_{TWIN}(\omega, g, s, u_0)_i$ will be recognized later as the Frechet derivative of the modified cost function used by the method according to the invention.

$$\delta R^{ob}(\omega, g, s, u_0) = \delta G^{ob}(\omega, g, s, u_0) - \delta G^{cal}_{TWIN}(\omega, g, s, u_0) = \qquad (27)$$
$$G^{ob}(\omega, g, s) - \{G^{cal}(\omega, g, s, u_0) + \delta G^{cal}_{TWIN}(\omega, g, s, u_0, \delta G^{ob}_{zo})\}$$

$\delta R^{ob}$ corresponds to the modified data residuals to be minimized.

$$\delta G^{cal}_{TWIN}(\omega, g, s, u_0, \delta G_{zo}^{ob}) = \int dx F_r(\omega, g, x, s, u_0)$$

$$\int dx \int d\hat{\omega} F_{z_o,r}^{-1}(\hat{\omega}, r; x, r, u_0) \delta G_{zo}^{ob}(\hat{\omega}, r) \qquad (28)$$

$\delta G_{TWIN}^{cal}$ corresponds to the pre-stack forward modeled reflection data on the basis migrated zero-offset time domain seismic. In equation (28) the operator on the right-hand side represents then an operator acting on zero-offset data to generate data corresponding to a pre-stack acquisition geometry.

Generally speaking, the computation of the computed transmitted data $G^{cal}(\omega, g, s, u_0)$ is done by solving a wave-equation or any approximation of the wave-equation in the initial velocity model $u_0(x)$. The computation of the computed scattered field $\delta G_{TWIN}^{cal}(\omega, g, s, u_0, \delta G_{zo}^{ob})$ is done by solving a scattering equation or any approximation of a scattering equation (as for instance the first order approximation known as the Born-approximation) in the velocity model $u_0(x)$ considering the high perturbation obtained from $F_{zo,r}^{-1}(\delta G_{zo}^{ob}, u_0)$.

After introducing the last three terms in equation (21) relative to the cost function $C^{RWI}$ and by simple algebraic manipulation, the modified cost function $C^{TWIN}$ that is optimized by the method according to the invention is expressed by equation (29):

$$C^{TWIN}(\delta \lambda_i) = \frac{1}{2} \int ds \int dg \int d\omega$$
$$\left| \delta R^{ob}(\omega, g, s, u_0) - \sum_i F_{TWIN}(\omega, g, s, u_0, F_{zo,r}^{-1}(\delta G_{zo}^{ob}, u_0))_i \delta \lambda_i \right|^2$$

The proposed modified cost function $C^{TWIN}$ depends on a single kind of unknowns, the smooth model perturbation expressed by $\delta \lambda_i$ (or $\delta m_b$ after model expansion).

Considering one linearized iteration, the minimization of $C^{TWIN}$ thus corresponds to solve a classical liner system $y = Ax$ where the unknown $x$ belong to a single class of parameters.

Issues related to multi-parameters inversion between reflectivity and background velocity, such as weighting, request of the Hessian cross parameter terms and multimodal behavior of the cost function, are largely relaxed thanks to the use of the modified cost function $C^{TWIN}$.

The residual term $\delta R^{ob}$ corresponds to the data residual not explained by the simulated data generated in the background medium $u_0$.

The first element $G^{cal}(\omega, g, s, u_0)$ of the simulated data corresponds to the calculated wavefield on the basis of the smooth model background $u_0$, essentially, the direct arrival and diving waves.

The second element of the modeled data $\delta G_{TWIN}^{cal}(\omega, g, s, u_0)$ is the computed pre-stack reflected wavefield on the basis of the zero-offset time domain input data and of the smooth model background $u_0$. The interpretation of this process is a mapping of the zero-offset time domain data to depth using the current background smooth model $u_0$ (zero-offset depth migration in the true amplitude sense) followed by mapping to pre-stack time domain (using a pre-stack Born modeling).

The Fréchet derivative $F_{TWIN}$ of the modified cost function is built from three components (see equation 26).

The first two components are represented by the Frechet derivative kernel $F_b$ through the operators kernel $B_1$ and $B_2$. $B_1$ simulates the effect of the smooth model perturbation on transmission or diving seismic events, whereas $B_2$ simulates the effect of smooth model perturbation on reflected seismic events. The third component represented by the second term in the right hand side of equation (26) imposes the coupling constraint between smooth model perturbation (velocity) and high frequency model perturbation (reflectivity). That is to keep up to the first order the computed zero-offset data unchanged with respect to the perturbed background model.

The method comprises estimating the smooth model perturbation by solving the normal equation associated to the modified cost function $C^{TWIN}$:

$$\sum_i \langle F_i^{TWIN}, F_j^{TWIN} \rangle_D \delta \lambda_j = \langle F_j^{TWIN}, \delta R^{ob} \rangle_D \qquad (30)$$

where $\langle ... \rangle_D$ represents the scalar product of functions belonging to data space D.

Direct inversion of the Hessian of the left hand side of equation (30) requires a very high computing effort.

Advantageously, the method comprises using a preconditioning to diagonalize the Hessian to solve the normal equation associated to the modified cost function $C^{TWIN}$.

In a variant, the method may comprise implementing a linear or non-linear local optimization method, wherein the implementation step comprises providing at least the gradient $J_i^{TWIN}$ of the cost-function with respect to the low frequency perturbation term. The gradient based optimization method is used to solve the normal equation associated to the modified cost function $C^{TWIN}$.

For example, the gradient based optimization method is a nonlinear conjugate gradient method (NLCG) or a limited memory Broyden-Fletcher-Goldfarb-Shanno method (l-BFGS).

Without loss of generality, the method comprises for example using a simple steepest-descent optimization method described below.

The model update at each linearized iteration will take the following classical form:

$$\delta \lambda_i = \delta \lambda_i^0 - \alpha^{opt} J_i^{TWIN} \qquad (31)$$

$\alpha^{opt}$ is an optimal step-length of the updated model that is estimated later in the method, $\delta\lambda_i^0$ is the model expansion coefficients corresponding to the initial model $J_i^{TWIN} = -\langle F_j^{TWIN}, \delta R^{ob}\rangle_D$ is the gradient of the modified cost function that appears in the right hand side of the normal equation (30).

An expanded expression of $J_i^{TWIN}$ may be derived after a few algebraic manipulations of the previous relations:

$$J_i^{TWIN} = \tag{32}$$

$$-\int dx \beta_i(x) \int ds \int dg \int d\omega F_b^*(\omega, g, x, s, u_0, F_{zo,r}^{-1}(\delta G_{zo}^{ob}, u_0))$$

$$\delta R^{ob}(\omega, g, s, u_0) +$$

$$\int dx \beta_i(x) \int dr \int d\hat{\omega} F_{zo,b}^*(\hat{\omega}, r, x, r, u_0, F_{zo,r}^{-1}(\delta G_{zo}^{ob}, u_0))$$

$$\int d\hat{x} (F_{zo,r}^{-1})^*(\hat{\omega}, r, \hat{x}, r, u_0)$$

$$\int ds \int dg \int d\omega F_r^*(\hat{\omega}, g, \hat{x}, s, u_0) \delta R^{ob}(\omega, g, s, u_0)$$

$J_i^{TWIN}$ may be written in the symbolic form:

$$J_i^{TWIN} = \int dx \beta_i(x) \{J_b(x) - J_b^{zo}(x)\} \tag{33}$$

By identification with the expanded expression of the modified cost function gradient $J_i^{TWIN}$, $J_b(x)$ and $J_b^{zo}(x)$ are expressed as the following:

$$J_b(x) = -\int ds \int dg \int d\omega F_b^*(\omega,g,x,s,u_0,F_{zo,r}^{-1}(\delta G_{zo}^{ob},u_0)) \\ \delta R^{ob}(\omega,g,s,u_0) \tag{34}$$

and $$J_b^{zo}(x) = -\int dr \int d\hat\omega F_{zo,b}^*(\hat\omega,r,x,r,u_0,F_{zo,r}^{-1}(\delta G_{zo}^{ob},u_0)) \tag{35}$$

$$\int d\hat{x}(F_{zo,r}^{-1})^*(\hat\omega,r,\hat{x},r,u_0)$$

$$\int ds \int dg \int d\omega F_r^*(\hat\omega,g,\hat{x},s,u_0)\delta R^{ob}(\omega,g,s,u_0)$$

The explicit expressions for the operators $F_r$, $F_b$ and their zero-offset version $F_{zo,r}$, $F_{zo,b}$ have already been established above. Their complex conjugates which appear in the the gradient of the modified cost function can therefore be expressed.

$F_{zo,r}$ is the zero-offset forward Born modeling operator. Its inverse $F_{zo,r}^{-1}$ has to be understood as a reflectivity migration/inversion operator that may be approximated by a true-amplitude zero-offset depth migration or a least-squares zero-offset migration. In addition, the conjugate or the adjoint operator $(F_{zo,r}^{-1})^*$ acts as a forward Born modeling operator, at least from the kinematic point of view.

Figure 5:
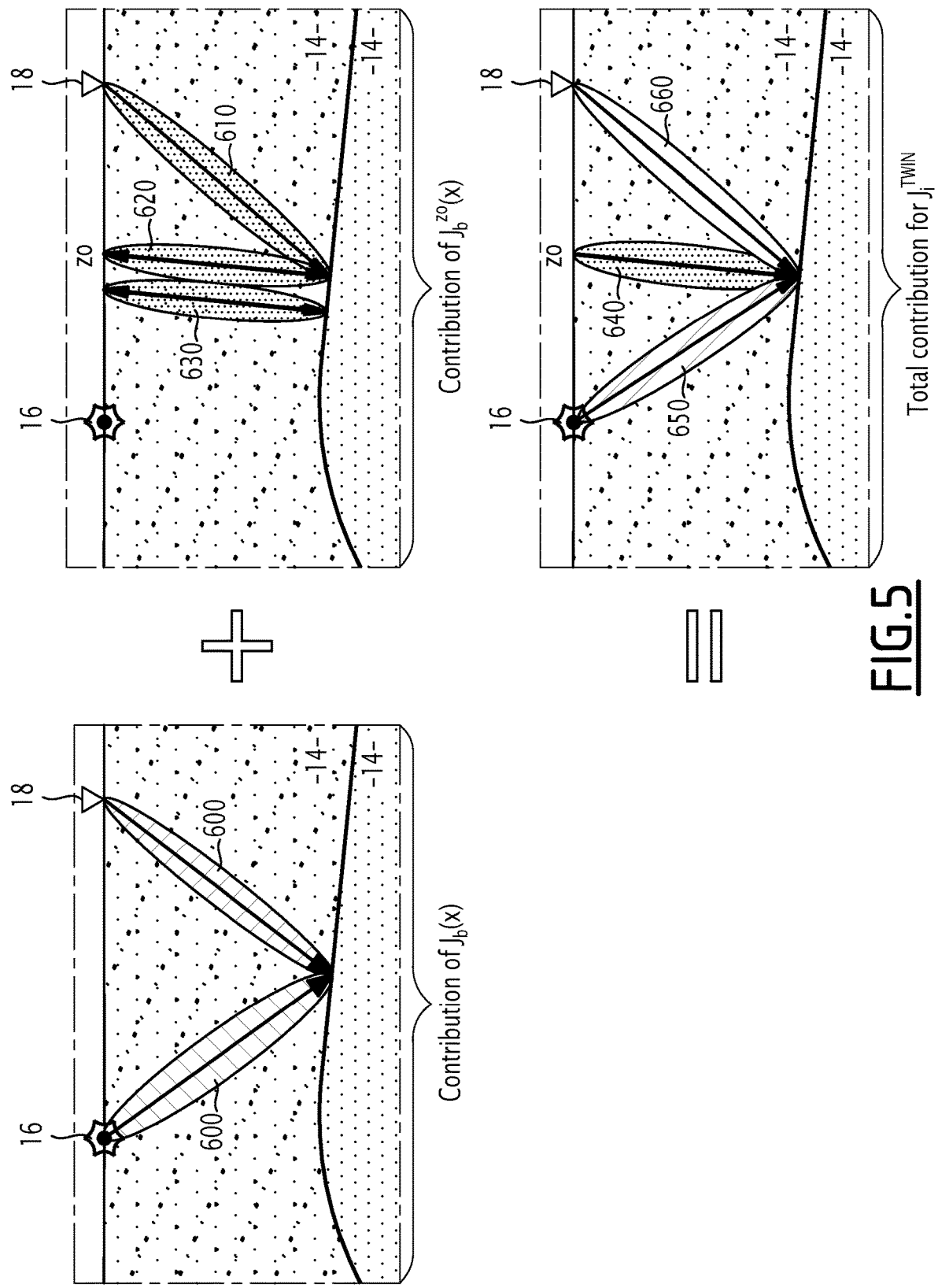
FIG. 5 is a schematic representation of the contributions of the different terms of the gradient of the modified cost function obtained with the method according to the invention.

FIG. 5 summarizes the various contributions contained in the gradient of the modified cost function $J_i^{TWIN}$ (equation 32).

The first term $J_b(x)$ of the gradient $J_i^{TWIN}$ has to be interpreted as the sum of the contribution of classical FWI gradient 600 (i.e. the diving sensitivity kernel or so-called "banana") computed on the basis of smooth background velocity model and the contribution of standard RFWI gradient method, i.e. the RFWI sensitivity kernel or the so-called "two rabbit ears" as showed on FIG. 5, which connects the seismic source 16 and receiver 18 to the reflector.

The second term $J_b^{zo}(x)$ of the gradient $J_i^{TWIN}$ has to be interpreted as the chain of the following sequence:

a pre-stack depth migration of the residuals $\delta R^{ob}(\omega,g,s,u_0)$ for each shot through the action of $\int ds \int dg \int d\omega F_r^*(\hat\omega,g,\hat{x},s,u_0)$, i.e. mapping from pre-stack time domain to depth domain which represents a first contribution 610 (FIG. 5), a demigration to zero-offset time domain through the action of $\int d\hat{x}(F_{zo,r}^{-1})^*(\hat\omega,r,\hat{x},r,u_0)$, i.e. mapping from depth to zero-offset data, which represents a second contribution 620, and conversion and inversion of the obtained zero-offset data to get a gradient update along the zero-offset wave paths through the action of $\int dr \int d\hat\omega F_{zo,b}^*(\hat\omega,r,x,r,u_0, F_{zo,r}^{-1}(\delta G_{zo}^{ob},u_0))$ which represents a third contribution 630.

For a single seismic reflection event that corresponds to a single couple of receiver-source position, the second term $J_b^{zo}(x)$ adds a third area of contribution 640, i.e. a third "banana" or "rabbit ear" that follows the normal ray and connect the reflection point to the zero-offset position at the acquisition surface, as showed in FIG. 5.

Therefore, the final outcome of the method according to the invention, is a sensitivity kernel made from four contributions 600, 610, 620, 630 ("bananas" or "rabbit ears").

As visible on FIG. 5, the contribution of a single reflected seismic event is then split along three wave-paths 640, 650, 660. Two of them 650, 660 connect the source 16 to a depth reflection point and back to the receiver 18 is spread or back-projected. The third wave-path 640 follows the normal ray from the reflection point up to the surface and back-projects along this wave-path a zero-offset residual that constrains the model update and depth positioning to be consistent.

The adjoint-source term used in the computation of the gradient of the proposed approach in the previous passage corresponds to pre-stack data term depending on the type of misfit function. For a variety of misfit functions, expressions of this adjoint-source term may be obtained using a state of the art adjoint source derivation method based on Lagrange multipliers as described in "*A review of the adjoint-state method for computing the gradient of a functional with geophysical applications*", Plessix, 2006, Geophysical Journal International, Volume 167, Issue 2, or automatic differentiation algorithms, described in "*Automatic differentiation of algorithms: from simulation to optimization*", Corliss et al., 2002, Springer Science & Business Media. Other information may be found in "*The adjoint method in seismology: I. Theory*", Fichtner et al., 2006, Physics of the Earth and Planetary Interiors, Vol. 157, Issues 1-2

For instance, adjoint source term corresponding to the squared residual cost-function as defined above has for adjoint source term $G^{ob}(\omega,g,s) - \{G^{cal}(\omega,g,s,u) + \delta G_{TWIN}^{cal}(\omega,g,s,u,\delta G_{zo}^{ob}))\}$ Typically, the method then comprises determining the optimal step $\alpha^{opt}$.

A first strategy comprises using the classical exact line search under the hypothesis that the modified cost function $C^{TWIN}$ may be accurately approximated by a quadratic function in the direction of the modified cost function gradient $J_i^{TWIN}$. Then, minimization of the optimization problem of the line-search along the gradient direction considered as a linear function versus the step length:

$$C^{TWIN}(\alpha) = \tag{36}$$

$$\frac{1}{2}\int ds \int dg \int d\omega |\delta R^{ob}(\omega,g,s,u_0) - \alpha \delta R^{cal}(\omega,g,s,u_0)|^2$$

gives the classical closed formula for the optimal step-length:

$$\alpha^{opt} = \frac{\langle \delta R^{ob}(\omega, g, s, u_0) | \delta R^{cal}(\omega, g, s, u_0) \rangle_D}{\langle \delta R^{cal}(\omega, g, s, u_0) | \delta R^{cal}(\omega, g, s, u_0) \rangle_D}, \quad (37)$$

where $$\delta R^{cal}(\omega, g, s, u_0) = -\sum_i F_{TWIN}(\omega, g, s, u_0, \delta m_r)_i J_i^{TWIN} \quad (38)$$

A second strategy comprises proceeding by minimization of the modified cost function $C^{TWIN}$ considered as a non-linear function versus the step-length. Therefore, an inexact line search, such as proposed by Nocedal and Wright, in *Numerical optimization, Springer Series in operations Research Financial Engineering*, Berlin, Springer, 2006, has to be operated on the following form of the modified cost function:

$$C^{TWIN}(\alpha) = \frac{1}{2} \int ds \int dg \int d\omega \left| \delta R^{ob}\left(\omega, g, s, u_0 - \alpha \sum_i \beta_i(x) J_i^{TWIN}\right) \right|^2 \quad (39)$$

In a variant, the optimization comprises providing at least one sensitivity ($F_j^{TWIN}$) of a computed data derivative with respect to the low frequency perturbation term, taken as the Fréchet derivative of the computed data. The computed data includes a calculated wavefield $G^{cal}(\omega,g,s,u_0)$ calculated from the initial model $u_0$ and a computed pre-stack reflected wavefield $\delta G_{TWIN}^{cal}(\omega,g,s,u_0,\delta G_{zo}^{ob})$ obtained on the basis of a zero-offset time domain input data and of the initial model $u_0$.

The implementation step then comprises adding a sensitivity contribution of a conventional Full Wave Inversion to a sensitivity contribution of a Reflected Full Wave Inversion and subtracting a supplementary term resulting from a chain of operators.

The chain of operators includes a first operator linearly acting on the low frequency perturbation $\delta m_b(x)$ synthetizing a zero-offset wavefield by modeling linear scattering effects generated by the perturbation $\delta m_b(x)$, a second migration operator $F_{zo,r}^{-1}$ transforming the synthetized zero-offset wavefield in a reflectivity image using the velocity model of the current iteration, and a third Born modeling operator generating from the reflectivity image a pre-stack modeled data at the same locations than a pre-stack observed data.

Finally, the method comprises generating an image of the subsurface of an area of interest from the optimal seismic velocity parameter model $w_{opt}(x)$ obtained after a plurality of optimization iterations. Methods for generating an image from the optimal seismic velocity parameter model $w_{opt}(x)$ are known in the art, for example from "*Prestack Depth Migration and Velocity Model Building*", Jones, I. F., 2008, Geophysics reprint series, Society of Exploration Geophysicists.

Said images may be two-dimension sections, three-dimension model block or slices extracted from the three-dimension model block.

Figure 6:
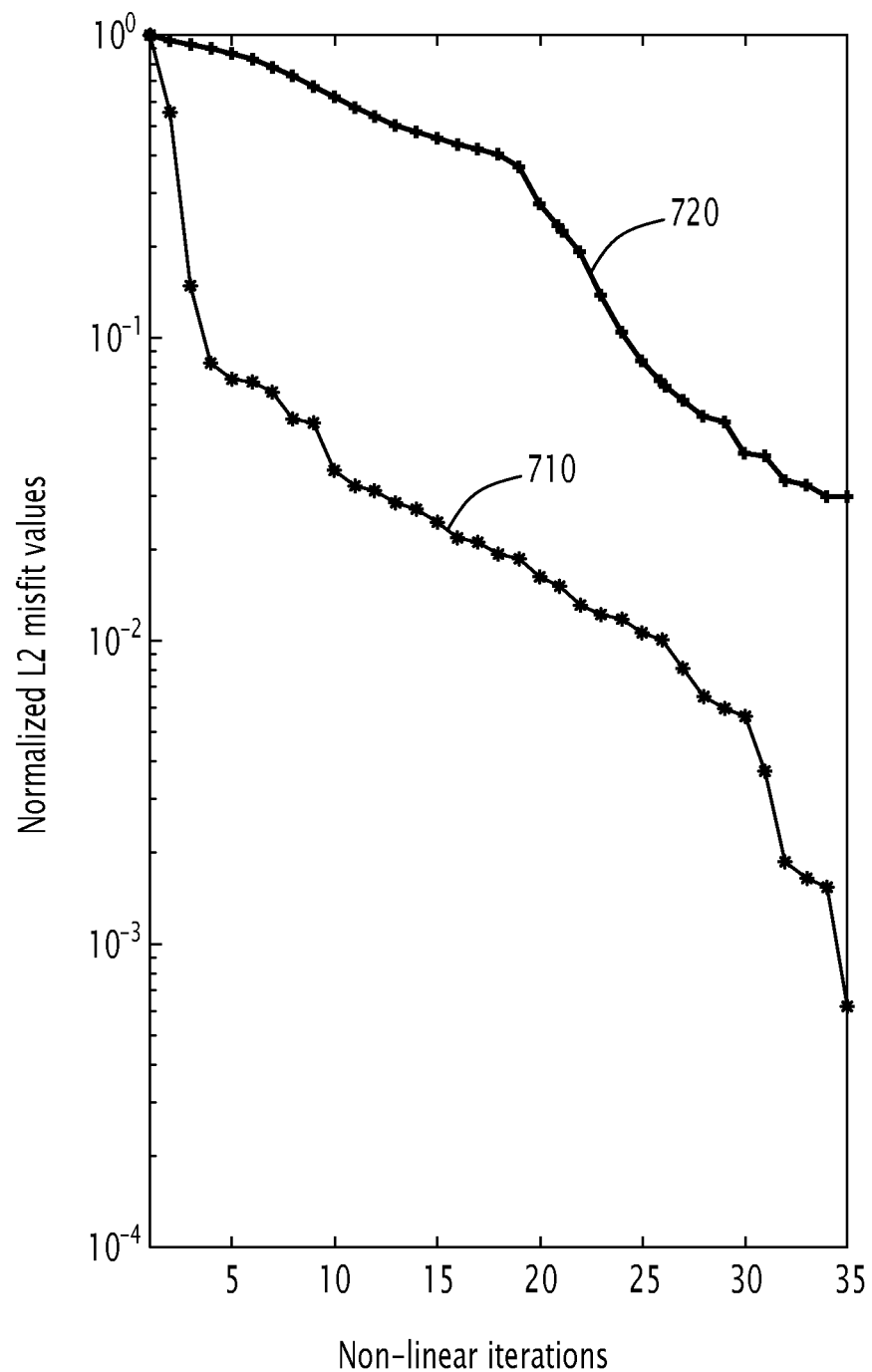
FIG. 6 is a graphical view of the convergence rate of a standard Reflection Full Waveform Inversion (RFWI) and the convergence rate of the method according to the invention, applied on the same 2D seismic dataset.

FIG. 6 is a graphical view of the convergence rate 710 of a standard Reflection Full Waveform Inversion (RFWI) and the convergence rate 720 of the method according to the invention, applied on the same synthetic 2D seismic dataset.

The lowest usable frequency in the dataset is about 5 Hz and the maximal offset is 5 km.

The only difference is that for the dataset inverted with the RFWI method, the effect of reflectivity-velocity coupling is not fully taken into account whereas with the method according to the invention, the effect is better taken into account.

Figure 7:
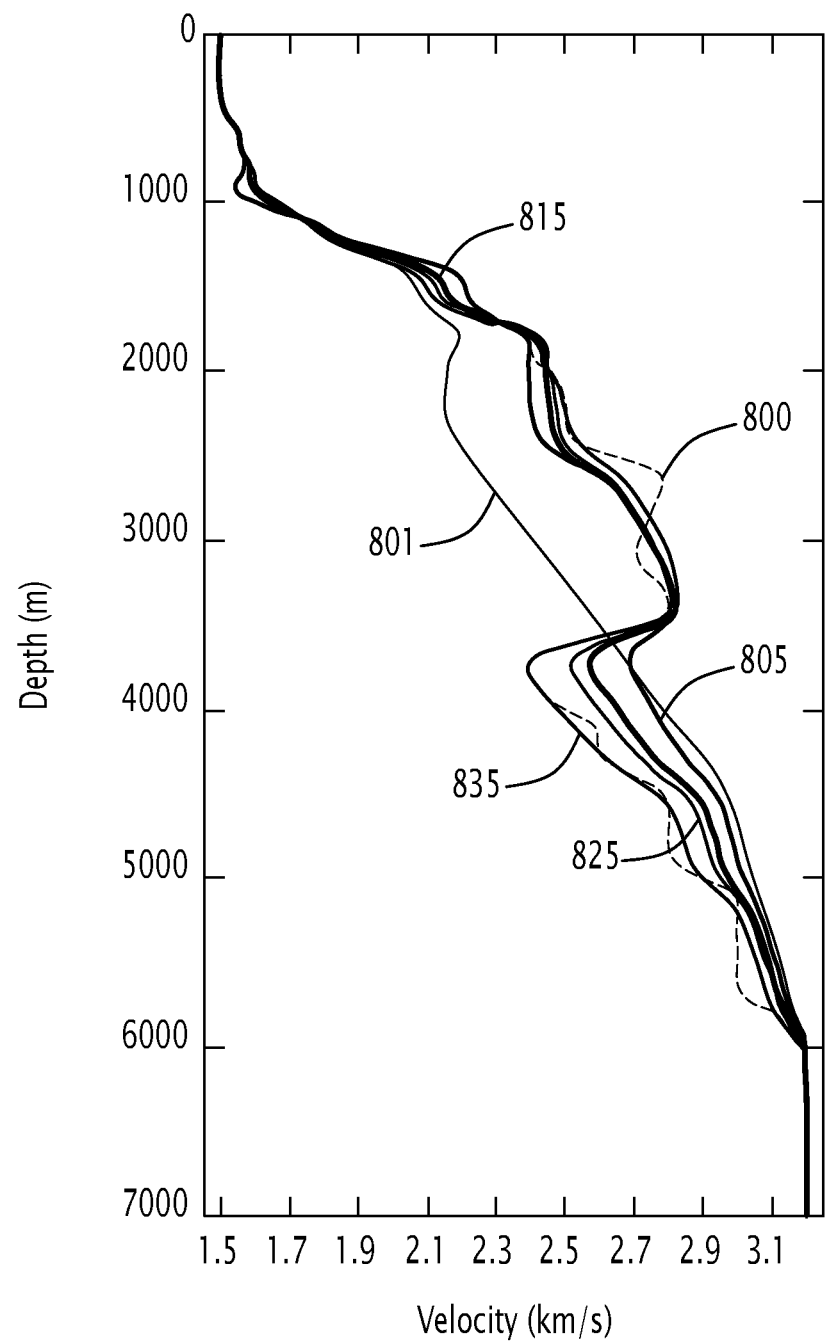
FIG. 7 and FIG. 8 are the inversion results obtained respectively with the standard Reflection Full Waveform Inversion (RFWI) and the method according to the invention, for a various number of iterations.
Figure 8:
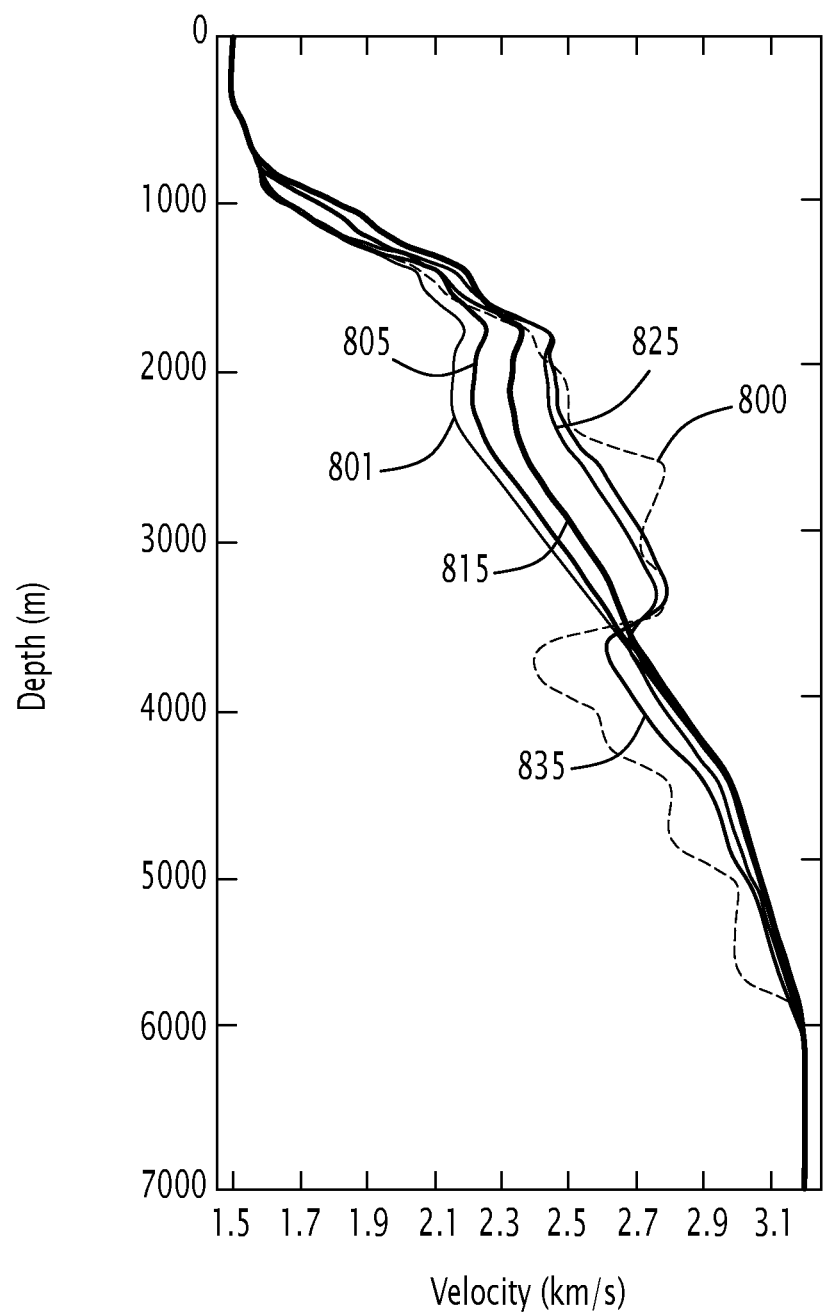

FIGS. 7 and 8 present an example of velocity vertical profile obtained respectively with the method according to the invention and with the RFWI method. The dashed line 800 corresponds to the true model and line referenced 801 corresponds to the initial velocity model.

The lines referenced 805, 815, 825, 835 represent respectively the result obtained after 5, 15, 25 and 35 iterations.

As it can be seen in FIG. 8, the standard RFWI method slowly updates the velocity model. With the method according to the invention (FIG. 7), the shallow part (depths from 1 km to 3 km) of the true model 800 are almost recovered whereas the RFWI method provides only a small update of the initial model 801.

After 35 iterations (lines 835, FIGS. 7 and 8), the method according to the invention recovers most of the smooth features of the true model even in the deep part (4 km to 6 km). While, for the same number of iterations, the RFWI method only starts updating the deep part of the model.

By comparing the misfit function values for both methods (FIG. 6), it can be noted that the misfit values obtained with the method according to the invention are about one order of magnitude smaller compared to those obtained with the standard RFWI method.

Generally, the images obtained with the method according to the invention and optimal seismic velocity parameter models may be used directly to understand complex geological features and locate oil and gas reservoirs for example.

In variant, said images and optimal seismic velocity parameter models are used as input for pore pressure prediction flows, time-lapse monitoring or reservoir characterization analysis.

The drilling of at least a well can then be carried out based on a position determined on the image.

The method according to the invention is computationally efficient.

The method is not limited to seismic reflected events only. Both transmitted arrivals and reflected arrivals may be inverted simultaneously.

The method is not limited to the full two-way equation solver but it remains valid for one way wave equation solver.

The invention claimed is:

1. A computer-implemented method for generating an image of a subsurface of an area of interest from seismic data, the method being carried out in a system for generating an image, the method comprising:
   providing seismic wavefields recorded with a plurality of seismic receivers over the area,
   providing a zero-offset seismic wavefield dataset,
   determining a seismic velocity parameter model w(x), said seismic velocity parameter model associating for each location x of the area a seismic velocity parameter w, said seismic velocity parameter model comprising an initial model $w_0(x)$, a low frequency perturbation term $\delta m_b(x)$ and a high frequency perturbation term $\delta m_r(x)$, and
   determining an optimal seismic velocity parameter model $w_{opt}(x)$ by computing a plurality of iterations, each iteration comprising calculating and optimizing a cost function, said cost function being a measure of discrepancies between the recorded seismic wavefields data and the modeled seismic wavefields data obtained using the seismic velocity parameter model w(x), said cost function being dependent on the zero-offset seismic wavefield and on the low frequency perturbation term $\delta m_b(x)$ as a parameter in the optimization of the cost function, the high frequency perturbation term $\delta m_r(x)$ being related to the velocity parameter model w(x) to keep the provided zero-offset seismic wavefield data invariant with respect to the low frequency perturbation term $\delta m_b(x)$, wherein a linearized perturbation of cost function with respect to $\delta m_b$ comprises at least a first linearized perturbation term $(F_b(u_0, \delta m_r))$ simulating the effect of the low frequency perturbation term on seismic data residuals and at least a second linearized perturbation term $(F_r(u_0)F_{zo,r}^{-1}(u_0) \, F_{zo,b}(u_0, \delta m_r))$ compensating the effect of the seismic data perturbation to keep the provided zero-offset seismic wavefield data invariant, the determination of the optimal seismic velocity parameter model $w_{opt}(x)$ comprising implementing a linear or a non-linear local optimization method, the implementation step comprising providing at least the gradient $(J_i^{TWIN})$ of the cost-function with respect to the low frequency perturbation term or/and at least one sensitivity $(F_j^{TWIN})$ of computed data derivatives with respect to the low frequency perturbation term, the computed data including a calculated refracted/transmitted wavefield $(G^{cal}(\omega,g,s,w))$ calculated from a seismic velocity model w obtained at a previous iteration and a computed pre-stack reflected wavefield $(\delta G_{TWIN}^{cal}(\omega,g,s,w,\delta G_{zo}^{ob}))$ obtained from a Born modeling based on the migrated zero-offset time domain data and the seismic velocity model obtained w from the previous iteration.

2. The method according to claim 1, wherein the seismic velocity parameter model w(x) comprises a compression waves velocity model v or a squared slowness model u(x), the squared seismic slowness u being related to the seismic velocity v by the relation $u=1/v^2$.

3. The method according to claim 1, wherein the seismic velocity parameter model w(x) comprises a seismic anisotropy term or an elasticity parameter term.

4. The method according to claim 1, wherein the step for determining the optimal seismic velocity parameter model $w_{opt}(x)$ comprises expanding the low frequency perturbation term $\delta m_b(x)$ on basis functions.

5. The method according to claim 4, wherein the step for determining the optimal seismic velocity parameter model $w_{opt}(x)$ comprises determining associated expansion coefficients of the expansion of the low frequency perturbation term $\delta m_b(x)$ on the basis functions.

6. The method according to claim 4, wherein the basis functions are chosen among: uniform blocks, splines, polynomial or wavelet functions.

7. The method according to claim 1, comprising, at each iteration, updating the velocity parameter model and evaluating the high frequency perturbation term $\delta m_r(x)$ from the zero-offset seismic dataset and the updated seismic velocity parameter model using a migration operator, the migration operator being an approximate or an exact iterative or non-iterative migration operator.

8. The method according to claim 7, wherein the migration operator is $F_{zo,r}^{-1}(\delta G_{zo}^{ob}, w_0+\delta m_b(x))$, where $F_{zo,r}^{-1}$ is an inverse zero offset modeling operator associated with the high frequency perturbation term $\delta m_r(x)$, $\delta G_{zo}^{ob}$ is an observed zero offset time domain data, $w_0+\delta m_b$ is a perturbed smooth model taking into account the low frequency perturbation term.

9. The method according to claim 1, wherein the determining step comprises calculating at least the calculated wavefield $G^{cal}(\omega,g,s,w)$ and calculating pre-stack forward modeled reflection data $(\delta G_{TWIN}^{cal}(\omega,g,s,w,\delta G_{zo}^{ob}))$ on the basis of migrated zero-offset domain seismic and evaluating the misfit between the calculated wavefield and the recorded data $(G^{ob})$.

10. The method according to claim 9, wherein the calculation of the pre-stack forward modeled reflection data $(\delta G_{TWIN}^{cal}(\omega,g,s,w,\delta G_{zo}^{ob}))$ comprises the evaluation of a zero-offset model using a migration operator, based on the velocity model w and the zero offset time domain observed data $(\delta G_{zo}^{ob})$.

11. The method according to claim 9, comprising evaluating the misfit between the calculated wavefield, the recorded data $(G^{ob})$ and a regularization term.

12. The method according to claim 1, wherein the implementation step comprises:
summing a sensitivity contribution of a Full Wave Inversion and a sensitivity contribution of a Reflected Full Wave Inversion and
subtracting a supplementary term resulting from a chain of operators,
the chain of operators including a first operator linearly acting on the low frequency perturbation $\delta m_b(x)$ synthetizing a zero-offset wavefield by modeling linear scattering effects generated by the perturbation $\delta m_b(x)$, a second migration operator $(F_{zo,r}^{-1})$ transforming the synthetized zero-offset wavefield in a reflectivity image using the velocity model of the current iteration, and a third Born modeling operator generating from the reflectivity image a pre-stack modeled data at the same locations than a pre-stack observed data.

13. The method according to claim 1, comprising providing seismic wavefields from several shots of seismic sources, and wherein providing at least the gradient $(J_i^{TWIN})$ of the cost-function with respect to the low frequency perturbation term comprises generating a gradient expression corresponding to a difference of a first gradient term $(J_b)$, minus a second gradient term $(J_b^{zo})$, the first gradient term $J_b$ being representative of a sum of:
a full wave inversion (FWI) gradient, computed based on the initial model $(u_0)$, and
a reflected waveform inversion (RFWI) gradient, the second gradient term $(J_b^{zo})$, resulting from at least three operations:
for each shot, a pre-stack depth migration of seismic data residuals $(\delta R^{ob}(\omega,g,s,u_0))$ through the action of a first operator $(F_r^*(\omega,g,\hat{x},s,u_0))$, or a pre-stack depth migration of an adjoint source depending on the misfit function between the calculated wavefields and the recorded data through the action of a first operator $(F_r^*(\hat{\omega},g,\hat{x},s,u_0))$,
demigration to zero-offset time domain through the action of a second operator $((F_{zo,r}^{-1})^*(\hat{\omega},r,\hat{x},r,u_0))$ and
conversion and inversion of the obtained zero-offset data to get a gradient update along zero-offset wave paths through the action of a third operator $(F_{zo,b}^*(\hat{\omega},r,x,r,u_0,F_{zo,r}^{-1}(\delta G_{zo}^{ob},u_0)))$.

14. A computer program product comprising instructions which, when the program is executed by a computer, cause the computer to carry out the method according to claim 1.

15. A system for generating an image of a subsurface of an area of interest from seismic data, said system comprising:
- a data recovery module for providing seismic wavefields recorded with a plurality of seismic receivers over the area,
- a zero-offset module for providing a zero-offset seismic wavefield dataset,
- a seismic velocity parameter model module for determining a seismic velocity parameter model $w(x)$, said seismic velocity parameter model associating for each location x of the area a seismic velocity parameter w, said seismic velocity parameter model comprising an initial model $w_0(x)$, a low frequency perturbation term $\delta m_b(x)$ and a high frequency perturbation term $\delta m_r(x)$,
- an optimal seismic velocity parameter model module for determining an optimal seismic velocity parameter model $w_{opt}(x)$ by computing a plurality of iterations, each iteration comprising calculating and optimizing a cost function, said cost function being a measure of discrepancies between the recorded seismic wavefields data and the modeled seismic wavefields data obtained using the seismic velocity parameter model $w(x)$, said cost function being dependent on the zero-offset seismic wavefield and on the low frequency perturbation term $\delta m_b(x)$ as a parameter in the optimization of the cost function, the high frequency perturbation term $\delta m_r(x)$ being related to the velocity parameter model $w(x)$ to keep the provided zero-offset seismic wavefield data invariant with respect to the low frequency perturbation term $\delta m_b(x)$, a linearized perturbation of cost function with respect to $\delta m_b$ comprises at least a first linearized perturbation term $(F_b(u_0, \delta m_r))$ simulating the effect of the low frequency perturbation term on seismic data residuals and at least a second linearized perturbation term $(F_r(u_0)F_{zo,r}^{-1}(u_0)F_{zo,b}(u_0,\delta m_r))$ compensating the effect of the seismic data perturbation to keep the provided zero-offset seismic wavefield data invariant,
- the optimal seismic velocity parameter model module being further configured to implement a linear or a non-linear local optimization method, by providing at least the gradient $(J_i^{TWIN})$ of the cost-function with respect to the low frequency perturbation term or/and at least one sensitivity $(F_j^{TWIN})$ of computed data derivatives with respect to the low frequency perturbation term, the computed data including a calculated refracted/transmitted wavefield $(G^{cal}(\omega,g,s,w))$ calculated from a seismic velocity model w obtained at a previous iteration and a computed pre-stack reflected wavefield $(\delta G_{TWIN}^{cal}(\omega,g,s,w,\delta G_{zo}^{ob}))$ obtained from a Born modeling based on the migrated zero-offset time domain data and the seismic velocity model obtained w from the previous iteration.

\* \* \* \* \*